US008845031B2

(12) United States Patent
Sasaki et al.

(10) Patent No.: US 8,845,031 B2
(45) Date of Patent: Sep. 30, 2014

(54) VEHICLE SEAT

(71) Applicant: NHK Spring Co., Ltd., Yokohama (JP)

(72) Inventors: Yoshitaka Sasaki, Yokohama (JP); Takeshi Chokyu, Yokohama (JP); Satoshi Matsuhashi, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 13 days.

(21) Appl. No.: 13/835,212

(22) Filed: Mar. 15, 2013

(65) Prior Publication Data

US 2013/0249269 A1  Sep. 26, 2013

(30) Foreign Application Priority Data

Mar. 26, 2012 (JP) ................. 2012-070040

(51) Int. Cl.
*A47C 7/24* (2006.01)
*B60N 2/58* (2006.01)
(52) U.S. Cl.
CPC ............ *B60N 2/5825* (2013.01); *B60N 2/5816* (2013.01); *B60N 2/5883* (2013.01)
USPC .................................................. 297/452.59
(58) Field of Classification Search
USPC ............... 297/452.59, 452.58, 452.62, 218.3, 297/218.5, 452.18
See application file for complete search history.

(56) References Cited

U.S. PATENT DOCUMENTS

| 3,630,572 | A | * | 12/1971 | Homier | 297/452.6 |
| 3,747,178 | A | * | 7/1973 | Harder, Jr. | 29/91.1 |
| 4,789,201 | A | * | 12/1988 | Selbert | 297/218.1 |
| 5,879,051 | A | * | 3/1999 | Cozzani | 297/218.3 |
| 5,964,017 | A | * | 10/1999 | Roberts | 29/91.1 |
| 7,469,968 | B2 | * | 12/2008 | Hazlewood | 297/452.58 |
| 7,901,002 | B2 | * | 3/2011 | Mashimo | 297/218.3 |
| 8,061,780 | B2 | * | 11/2011 | Tsuji et al. | 297/452.58 |

FOREIGN PATENT DOCUMENTS

JP  3838495 B2  8/2006

* cited by examiner

*Primary Examiner* — Milton Nelson, Jr.
(74) *Attorney, Agent, or Firm* — Knobbe Martens Olson & Bear LLP

(57) ABSTRACT

There is provided a vehicle seat including: a framework member that structures a framework of a seatback; a center rear face cover that structures a central portion of a rear face of the seatback; a side rear face cover that structures the seat width direction side portion; an overlap portion at which an end portion of the center rear face cover and an end portion of the side rear face cover are sewn together in an overlapping state, and extending to a seat forward side; an anchor member that is disposed at the overlap portion and that is anchored at the framework member and pulls the overlap portion in to the seat forward side; and a restraining portion that joins at least one of the overlap portion and the anchor member to the framework member, and restrains movement of the overlap portion.

5 Claims, 4 Drawing Sheets

VEHICLE SEAT

CROSS-REFERENCE TO RELATED APPLICATION

This application is based on and claims priority under 35 USC 119 from Japanese Patent Application No. 2012-070040 filed on Mar. 26, 2012, the disclosure of which is incorporated by reference herein.

BACKGROUND

1. Technical Field

The present invention relates to a seat to be used in a vehicle.

2. Related Art

In a vehicle seat, a rear face of a seatback is curved so as to be hollowed to a seatback inner side (a forward side), and the appearance of the seatback is improved. In addition, the thickness of the seatback is reduced and legroom for a rear seat is increased (for example, see Japanese Patent No. 3,838,495).

This vehicle seat includes a rear back cover portion, which structures a central portion of the rear face of the seatback, and framework cover portions, which structure two seat width direction sides of the rear face of the seatback. Joining strips are sewn to seam portions between the rear back cover portion and the framework cover portions, and a vertical core is attached to a distal end portion of each joining strip. A longitudinal direction middle portion of each vertical core is joined to a seatback frame. Thus, the vertical cores are curved so as to project to the seat forward side, and the rear back cover portion and framework cover portions are curved to the seat forward side.

However, in the vehicle seat described above, the pair of vertical cores are anchored at a horizontal joining pole, and the horizontal joining pole is anchored to frame wires of the seatback frame by tying members. Therefore, the number of components is large. Accordingly, anchoring the vertical cores to the seatback frame without using the horizontal joining pole has been considered. In this case, preparing a structure that may suppress detachment of the vertical cores from the seatback frame is desirable.

SUMMARY

In consideration of the situation described above, an object of the present invention is to provide a vehicle seat in which the appearance of a seatback may be improved and a thickness of the seatback may be reduced, while detachment of anchor members from framework members is suppressed.

A first aspect of the present invention provides a vehicle seat including:

a framework member that structures a framework of a seatback;

a center rear face cover that structures a central portion of a rear face of the seatback;

at each of two seat width direction side portions of the rear face of the seatback, a side rear face cover that adjoins the center rear face cover and structures the seat width direction side portion;

an overlap portion at which an end portion of the center rear face cover and an end portion of the side rear face cover are sewn together in an overlapping state, the overlap portion extending to a seat forward side from the center rear face cover and the side rear face cover in plan view;

an anchor member that is disposed at the overlap portion and that is anchored at the framework member and pulls the overlap portion in to the seat forward side; and a restraining portion that joins at least one of the overlap portion and the anchor member to the framework member, and restrains movement of the overlap portion.

In the vehicle seat according to the first aspect of the present invention, the central portion of the rear face of the seatback is structured by the center rear face cover, and the side rear face covers are disposed at the two seat width direction sides of the center rear face cover. Each region at which an end portion of the center rear face cover overlaps with an end portion of a side rear face cover serves as the overlap portion. In plan view, these overlap portions extend to the seat forward side from the center rear face cover and the side rear face covers.

The anchor member is provided at each overlap portion, and the overlap portion is pulled in to the seat forward side by the anchor member being anchored at the framework member of the seatback. Therefore, if the anchor member is structured as, for example, a "J-hook" that is formed in a "J" shape in cross section and the anchor member extends in the seat up-and-down direction along the overlap portion, the whole of the anchor member and the whole of the overlap portion are pulled in to the seat forward side. As a result, the appearance of the seatback may be improved and the thickness of the seatback may be reduced.

At least one of the overlap portion and the anchor member is joined to the framework member by the restraining portion. Thus, movements of the overlap portion are restrained by the restraining portion. Therefore, even if the overlap portion acts to move due to, for example, a tension force acting on the center rear face cover and the side rear face cover, movement of the overlap portion is restrained by the restraining portion, and hence movement of the anchor member is restrained. Therefore, detachment of the anchor member from the framework member may be suppressed.

A second aspect of the present invention provides the vehicle seat according to the first aspect, wherein the restraining portion includes:

a joining member to which at least one of the overlap portion and the anchor member is sewn, the joining member being disposed along the framework member; and a fixing member that fixes the joining member to the framework member.

In the vehicle seat according to the second aspect of the present invention, the joining member to which at least one of the overlap portion and the anchor member is sewn is arranged along the framework member, and the joining member is fixed to the framework member by the fixing member. Accordingly, after the anchor member is anchored at the framework member, the joining member is fixed to the framework member along the framework member. Thus, relative movement of the joining member with respect to the framework member may be restrained. Therefore, detachment of the anchor member from the framework member may be effectively suppressed.

A third aspect of the present invention provides the vehicle seat according to the second aspect, wherein the joining member is sewn to both the anchor member and the overlap portion.

In the vehicle seat according to the third aspect of the present invention, the joining member is sewn to both the overlap portion and the anchor member. Therefore, regions of sewing of the joining member and the anchor member to the overlap portion may be set to one location. In addition, because movement of the anchor member is restrained by the joining member directly, detachment of the anchor member from the framework member may be even more effectively suppressed.

A fourth aspect of the present invention provides the vehicle seat according to the first aspect, wherein:

the anchor member includes a hook portion that is open to the seat rear side in a state in which the anchor member is anchored at the framework member, and the framework member includes a flange portion at which the hook portion is anchored, the flange portion being angled in plan view to a seat width direction inner side toward the seat forward side.

In the vehicle seat according to the fourth aspect of the present invention, in the state in which the anchor member is anchored at the flange portion, the hook portion of the anchor member is open to the seat rear side, and in plan view, the flange portion is angled to the seat width direction inner side toward the seat forward side. Therefore, the anchor member may be anchored at the flange portion from the seat rear side more easily than in a case in which the flange portion is inflected to the seat forward side from the framework member. Thus, characteristics of assembly when the anchor member is being anchored at the framework member may be improved.

A fifth aspect of the present invention provides the vehicle seat according to the first aspect, further including, at each of two seat width direction side faces of the seatback, a fastener that detachably joins a side face cover structuring the seat width direction side face to the side rear face cover.

In the vehicle seat according to the fifth aspect of the present invention, the side face cover and the side rear face cover are joined together by the fastener. Therefore, the side face cover and side rear face cover may be joined together by the fastener after the anchor member has been anchored at the framework member. Moreover, even if a tension force acts on the side rear face cover when the side face cover and side rear face cover are being joined together by the fastener, detachment of the anchor member from the framework member may be suppressed by the restraining portion. Therefore, characteristics of assembly when the anchor member is being anchored at the framework member may be improved.

According to a vehicle seat in accordance with the first aspect of the present invention, the appearance of the seatback may be improved and a thickness of the seatback may be reduced, while detachment of the anchor members from the framework members is suppressed.

According to a vehicle seat in accordance with the second aspect of the present invention, detachment of the anchor members from the framework members may be effectively suppressed.

According to a vehicle seat in accordance with the third aspect of the present invention, detachment of the anchor members from the framework members may be even more effectively suppressed.

According to a vehicle seat in accordance with the fourth aspect of the present invention, assembly characteristics when the anchor members are being anchored at the framework members may be improved.

According to a vehicle seat in accordance with the fifth aspect of the present invention, assembly characteristics when the anchor members are being anchored at the framework members may be improved.

BRIEF DESCRIPTION OF THE DRAWINGS

Exemplary embodiments of the present invention will be described in detail based on the following figures, wherein.

DETAILED DESCRIPTION

Figure 2:
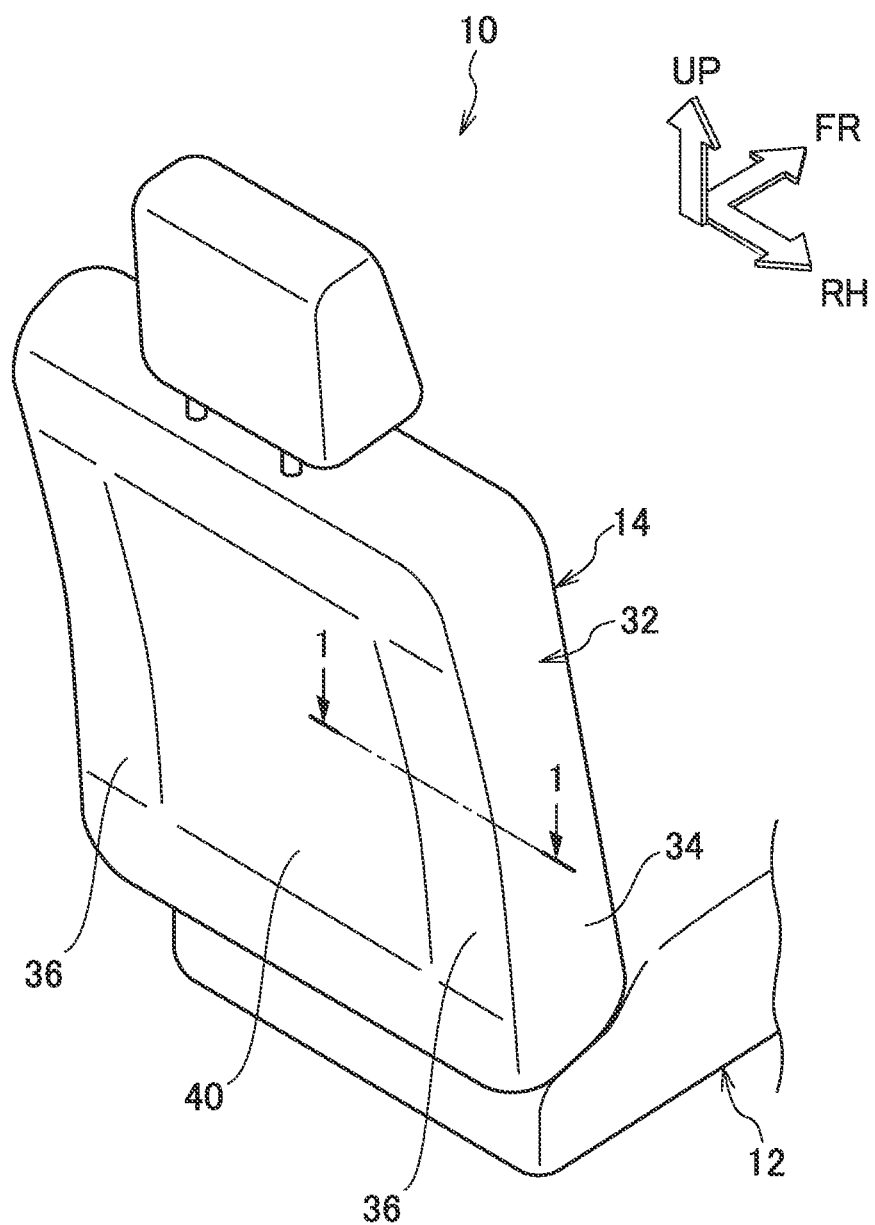
FIG. 2 is a perspective diagram, viewed from diagonally rearward of the seat, showing the vehicle seat in accordance with the exemplary embodiment of the present invention.

FIG. 2 shows a perspective diagram in which a vehicle seat 10 in accordance with an exemplary embodiment of the present invention is viewed from diagonally rearward of the seat. The arrow FR, which is shown as appropriate in the drawings, indicates forward of the seat, an arrow RH indicates rightward of the seat (one seat width direction side), and an arrow UP indicates upward of the seat. The vehicle seat 10 is disposed in a condition in which a seat front-and-rear direction matches a vehicle front-and-rear direction and a seat width direction matches a vehicle width direction.

As shown in this drawing, the vehicle seat 10 is equipped with a seat cushion 12, on which an occupant sits, and a seatback 14, which supports a back area of the occupant. The seatback 14 is disposed in a condition of being stood up from a seat rearward end portion of the seat cushion 12.

Figure 1:
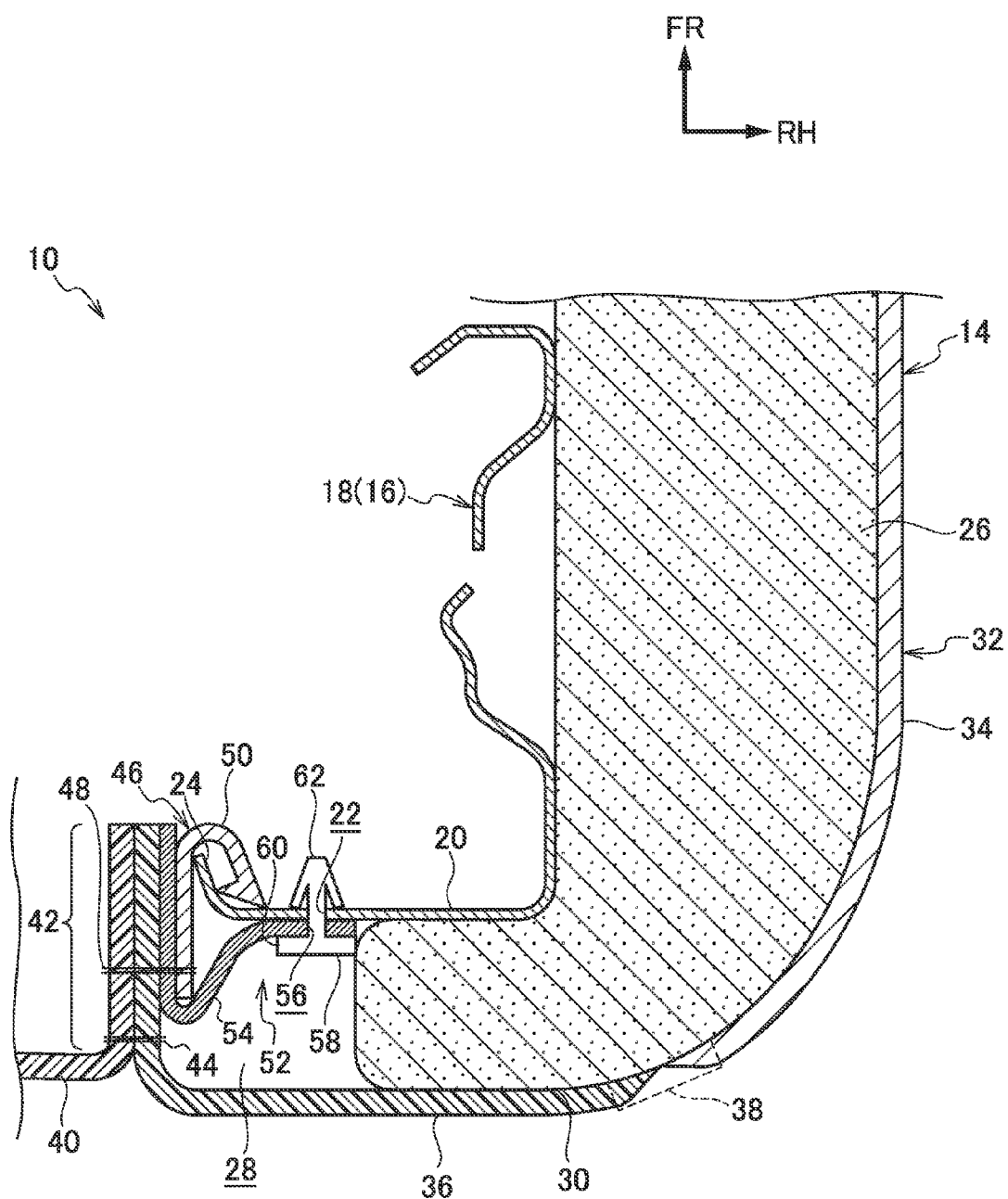
FIG. 1 is a magnified plan sectional diagram (a sectional diagram taken along line 1-1 in FIG. 2) showing principal portions of a vehicle seat in accordance with an exemplary embodiment of the present invention.

As shown in FIG. 1, the seatback 14 includes a seatback frame 16, a back pad 26 (broadly speaking, an element that may be understood as being a pad), and a trim cover 32. The seatback frame 16 serves as a framework member structuring a framework of the seatback 14, and the trim cover 32 structures an outer periphery portion of the seatback 14. The respective structures described below are structured with left-and-right symmetry in the seat width direction. Accordingly, a seat right side region of the seatback 14 is described and no description is given of a seat left side region of the seatback 14.

The seatback frame 16 includes a side frame 18 disposed at a seat right side portion of the seatback 14. The side frame 18 is fabricated of a metal plate, and extends in the seat up-and-down direction with the plate thickness direction along the seat width direction. A lower end portion of the side frame 18 is joined, by a conventional widely known recliner mechanism, to a cushion frame (not shown in the drawings) that structures a framework member of the seat cushion 12. An upper end portion of the side frame 18 is joined to a pipe-shaped upper frame (not shown in the drawings) structuring a portion of the seatback frame 16.

Figure 3:
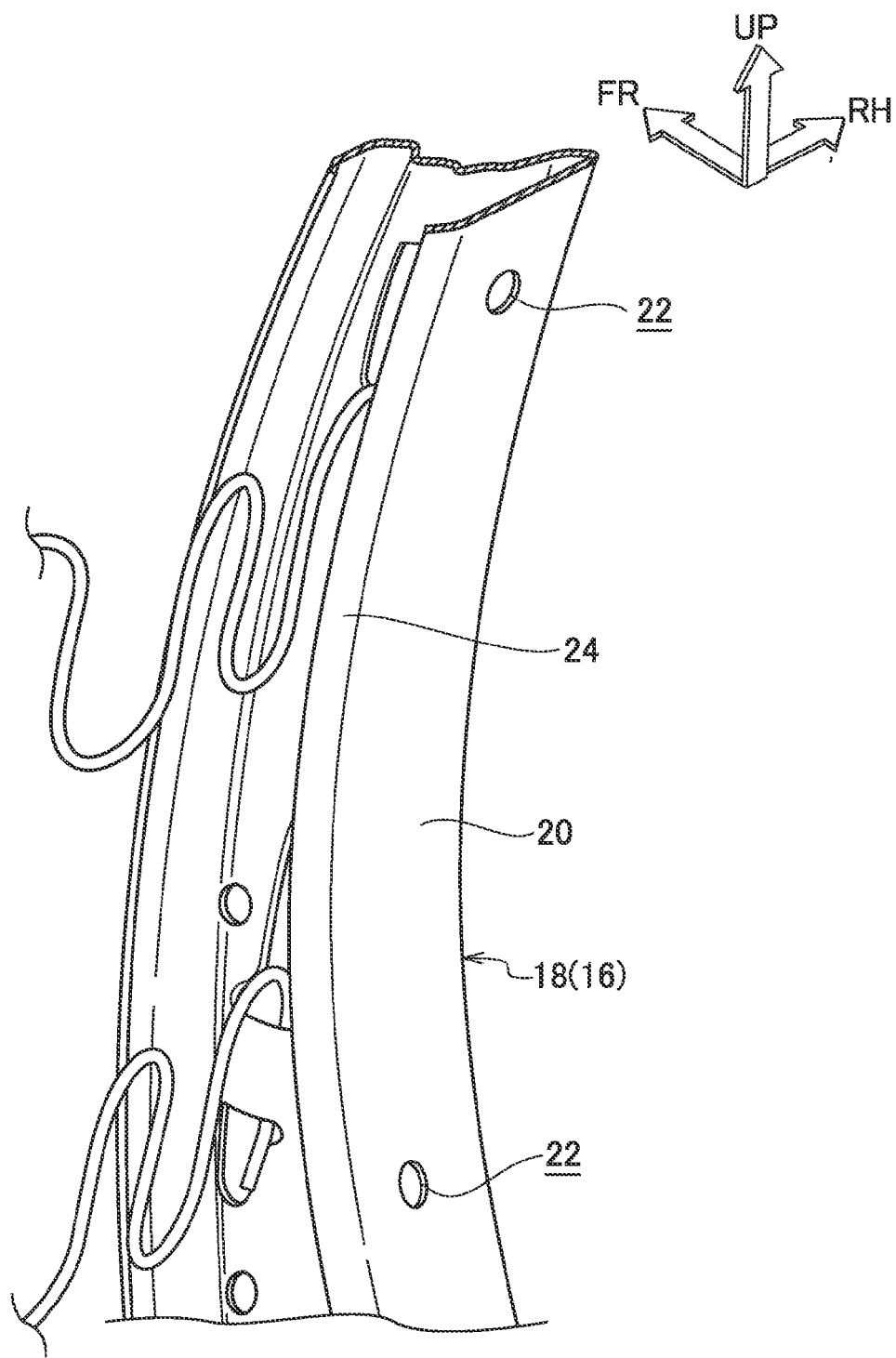
FIG. 3 is a perspective diagram showing a side frame that is shown in FIG. 1.

The side frame 18 is formed in a substantial "W" shape that is open to the seat left side in plan sectional view. A rear end wall 20 of the side frame 18 extends in the seat width direction in plan sectional view, and is curved so as to project to the seat forward side in side view (see FIG. 3). A pair of fixing holes 22 are formed penetrating through the rear end wall 20 for the fixing of clips 58, which are described below. The pair of fixing holes 22 are formed in circular shapes and are disposed to be spaced apart in the seat up-and-down direction (see FIG. 3). A flange portion 24 is formed at a distal end portion (a seat left side end portion) of the rear end wall 20. The flange portion 24 is disposed to be angled to the seat left side (a seat width direction inner side) toward the seat forward side in plan sectional view, and extends in the seat up-and-down direction along the side frame 18.

The back pad 26 is formed of a foam member of urethane or the like. The back pad 26 is formed in a substantial "C" shape that is open to the seat rear side in plan sectional view, and is supported by the seatback frame 16. Accordingly, a recess portion 28, in which the back pad 26 is not disposed, is formed at a seat rear side portion of the seatback 14. A corner portion 30 at the seat rear side of the back pad 26 is formed in a substantially circular arc shape in plan view.

The trim cover 32 is fabricated of a cloth material and is formed overall in a bag shape that is open to downward of the seat. The trim cover 32 includes a side trim cover portion 34, a first rear trim cover portion 36 and a second rear trim cover portion 40. The side trim cover portion 34 serves as a side face cover, which structures a seat right side face of the seatback 14. The first rear trim cover portion 36 serves as a side rear face cover, which structures a seat right side portion (seat width direction outer side portion) of the rear face of the seatback 14. The second rear trim cover portion 40 serves as a center rear face cover, which structures a middle portion of the rear face of the seatback 14. The trim cover 32 is further provided with a J-hook 46, which serves as an anchor member, and a restraining portion 52.

The side trim cover portion 34 is disposed at the seat right side (the seat width direction outer side) of the back pad 26 and covers the back pad 26. A seat rear end portion of the side trim cover portion 34 is disposed at a middle portion of the corner portion 30 of the back pad 26. The corner portion 30 is formed in a circular arc shape.

The first rear trim cover portion 36 is inflected in a substantial "L" shape in plan sectional view, and is disposed at the seat left side of the seat rear end portion of the side trim cover portion 34. A seat right end portion of the first rear trim cover portion 36 is detachably joined to the seat rear side end portion of the side trim cover portion 34 by a fastener 38. The first rear trim cover portion 36 is curved round to the seat forward side substantially at the seat rear side of the flange portion 24 of the side frame 18. Thus, a seat left side end portion of the first rear trim cover portion 36 extends to the seat forward side from the first rear trim cover portion 36.

The second rear trim cover portion 40 is formed in a substantial "U" shape that is open to the seat forward side in plan sectional view, and is disposed at the seat left side and seat forward side of the first rear trim cover portion 36. A seat rightward half of the second rear trim cover portion 40 is shown in FIG. 1. A seat right side region of the second rear trim cover portion 40 is inflected to the seat forward side so as to oppose the seat left side end portion of the first rear trim cover portion 36, and a seat right side end portion of the second rear trim cover portion 40 extends to the seat forward side from the second rear trim cover portion 40. A region at which the first rear trim cover portion 36 and the second rear trim cover portion 40 overlap serves as an overlap portion 42. The overlap portion 42 is sewn together at the region of a first seam portion 44.

The J-hook 46 is fabricated of resin, and is formed in a substantial "J" shape that is open to the seat rear side in plan sectional view. The J-hook 46 is disposed at the seat right side of a distal end portion (a seat forward side end portion) of the overlap portion 42, and the J-hook 46 extends in the seat up-and-down direction along the distal end portion of the overlap portion 42. At the region of a second seam portion 48, a proximal end portion of the J-hook 46 is sewn to a joining trim cover 54, which is described below, and to the distal end portion of the overlap portion 42. The J-hook 46 includes a hook portion 50, which is provided extending to the seat forward side from the proximal end portion of the J-hook 46. The hook portion 50 is formed in a substantial "U" shape in cross section, and is anchored at the flange portion 24 of the side frame 18. Consequently, the first rear trim cover portion 36 and the second rear trim cover portion 40 are pulled in to the seat forward side by the J-hook 46, and are anchored at the side frame 18 via the J-hook 46.

Next, the restraining portion 52, which is a principal portion of the present invention, is described.

The restraining portion 52 includes the joining trim cover 54, which serves as a joining member, and the clips 58, each of which serves as a fixing member.

The joining trim cover 54 is fabricated of a cloth material in a long, narrow, substantially rectangular shape, and is disposed at the seat right side of the overlap portion 42. A seat left side end portion of the joining trim cover 54 is disposed between the overlap portion 42 and the J-hook 46. The joining trim cover 54 extends along the seat front-and-rear direction in plan view, and is sewn to both the overlap portion 42 and the J-hook 46 in the region of the second seam portion 48. A seat width direction middle portion of the joining trim cover 54 is inflected to the seat forward side at the proximal end portion of the J-hook 46. A seat right side end portion of the joining trim cover 54 is disposed along a seat rear side face of the rear end wall 20. A pair of penetrating holes 56 are formed in the joining trim cover 54, at positions corresponding with the aforementioned fixing holes 22 of the rear end wall 20. A length dimension in the seat width direction from the penetrating holes 56 to the distal end of the hook portion 50 is set shorter than a length dimension in the seat width direction from the fixing holes 22 of the rear end wall 20 to the distal end of the flange portion 24.

Each clip 58 is fabricated of resin. The clip 58 includes a seat portion 60 in a substantially circular disc shape and an anchoring portion 62 that protrudes to the seat forward side from a central portion of the seat portion 60. A distal end portion of the anchoring portion 62 is formed in a substantial wedge shape in cross section. The anchoring portion 62 passes through the penetrating hole 56 in the joining trim cover 54 and the fixing hole 22 in the side frame 18, and the distal end portion of the anchoring portion 62 is anchored at the side frame 18. Thus, the joining trim cover 54 is fixed to the side frame 18 by the clips 58.

Now, while a procedure when the trim cover 32 is attached to the seatback 14 is described, the operation and effects of the present invention are described.

The seat left side end portion of the first rear trim cover portion 36 and the seat right side end portion of the second rear trim cover portion 40 are disposed along the seat front-and-rear direction so as to oppose one another. Then the first rear trim cover portion 36 and second rear trim cover portion 40 are sewn together in the region of the first seam portion 44. Thus, the overlap portion 42 is formed. The overlap portion 42 is sewn to both the J-hook 46 and the joining trim cover 54 in the region of the second seam portion 48.

The bag-shaped trim cover 32 that is open to downward of the seat is placed over the back pad 26. Thus, the back pad 26 is covered with the trim cover 32. At this time, without the seat rear side end portion of the side trim cover portion 34 and the seat rightward end portion of the first rear trim cover portion 36 being joined, the overlap portion 42 is disposed in the recess portion 28.

In this state, the first rear trim cover portion 36 is lifted to the seat rear side. In this state, in which the J-hook 46 can be seen from the seat rear side of the seatback 14, the J-hook 46 is moved to the seat forward side and anchored at the flange portion 24 of the side frame 18. Accordingly, the whole length of the J-hook 46 is curved so as to project to the seat forward side along the flange portion 24, and the overlap portion 42 (including the first rear trim cover portion 36 and the second rear trim cover portion 40) is pulled in to the seat forward side. Thus, the first rear trim cover portion 36 and the second rear trim cover portion 40 are curved along the side frame 18 so as to project to the seat forward side.

Then the joining trim cover 54 that has been sewn to the overlap portion 42 is placed along the seat rear side face of the rear end wall 20, and the clips 58 are inserted into the penetrating holes 56 of the joining trim cover 54 and the fixing holes 22 of the rear end wall 20. Thus, the joining trim cover 54 is fixed to the rear end wall 20 with the clips 58. Hence, movements of the J-hook 46 and the overlap portion 42 to the seat left side are restricted. The fastener 38 is closed downward along the seat in this state, and the seat rear end portion of the side trim cover portion 34 and the seat right end portion of the first rear trim cover portion 36 are joined together.

As described above, the overlap portion 42 and the side frame 18 are joined together by the restraining portion 52 (the joining trim cover 54 and the clips 58), and movements of the overlap portion 42 to the seat left side (the seat width direction inner side) are restrained. Hence, if a tension force acts on the first rear trim cover portion 36 and the second rear trim cover portion 40 in a direction toward the seat left side (the seat width direction inner side) and the overlap portion 42 and J-hook 46 act to move to the seat left side (the side of the distal end portion of the flange portion 24), movement of the overlap portion 42 to the seat left side is restrained by the restraining portion 52, and therefore movement of the J-hook 46 is restrained. Because the J-hook 46 is sewn to the overlap portion 42 along the seat up-and-down direction, the whole length of the overlap portion 42 is pulled in to the seat forward side by the J-hook 46, and the first rear trim cover portion 36 and second rear trim cover portion 40 are curved along the side frame 18 so as to project to the seat forward side. Therefore, the appearance of the seatback 14 may be improved and thickness of the seatback 14 may be reduced, while detachment of the J-hook 46 from the side frame 18 (the flange portion 24) is suppressed.

Further, after the joining trim cover 54 is sewn to the overlap portion 42 and the J-hook 46 is anchored at the flange portion 24 of the side frame 18, the joining trim cover 54 from the overlap portion 42 is disposed along the rear end wall 20 and is fixed to the side frame 18 with the clips 58. In addition, the length dimension in the seat width direction from the penetrating holes 56 to the distal end of the hook portion 50 is set to be shorter than the length dimension in the seat width direction from the fixing holes 22 in the rear end wall 20 to the distal end of the flange portion 24. Therefore, relative movement of the joining trim cover 54 with respect to the rear end wall 20 may be restrained and detachment of the J-hook 46 from the side frame 18 (the flange portion 24) may be effectively suppressed.

The joining trim cover 54 is sewn to both the J-hook 46 and the overlap portion 42 in the region of the second seam portion 48. Therefore, a portion of the overlap portion 42 that is sewn to the joining trim cover 54 and the J-hook 46 may be set to a single location. Moreover, because movement of the J-hook 46 is restricted directly by the joining trim cover 54, detachment of the J-hook 46 from the side frame 18 (the flange portion 24) may be even more effectively suppressed.

The hook portion 50 of the J-hook 46 is open to the seat rear side and is anchored at the flange portion 24 of the side frame 18, and the flange portion 24 is angled in plan view to the seat left side (the seat width direction inner side) toward the seat forward side. Therefore, the J-hook 46 may be anchored at the flange portion 24 from the seat rear side more easily than in a structure in which the flange portion 24 is inflected to the seat forward side from the rear end wall 20. Thus, characteristics of assembly when the J-hook 46 is being anchored at the side frame 18 may be improved.

The seat rear end portion of the side trim cover portion 34 and the seat right end portion of the first rear trim cover portion 36 are joined together by the fastener 38. Therefore, the J-hook 46 may be anchored at the side frame 18 in the state in which the first rear trim cover portion 36 is lifted to the seat rear side, and then the seat rear end portion of the side trim cover portion 34 and seat right end portion of the first rear trim cover portion 36 may be joined together with the fastener 38. Further, for example, in a case in which the fastener 38 at the seat rear-left corner portion of the seatback 14 is closed first, even if a tension force to the seat left side acts on on the first rear trim cover portion 36 and a pulling force to the seat left side acts on the J-hook 46 at the seat right side, detachment of the J-hook 46 from the flange portion 24 may be suppressed.

The J-hooks 46 are provided as a pair in the seat width direction, and movement of each overlap portion 42 to the seat width direction inner side is restrained by the joining trim cover 54 and the clips 58. Therefore, if, for example, the J-hook 46 disposed at the seat right side is anchored at the flange portion 24 and then the J-hook 46 disposed at the seat left side is anchored at the seat left side flange portion 24, detachment of the J-hook 46 disposed at the seat right side from the flange portion 24 while the J-hook 46 disposed at the seat left side is being anchored may be suppressed. Thus, characteristics of assembly when the J-hooks 46 are being anchored at the side frames 18 may be improved.

Because the joining trim cover 54 is fabricated of a cloth material, the joining trim cover 54 may be placed along the rear side face of the rear end wall 20 of the side frame 18 with ease.

VARIANT EXAMPLE

Figure 4:
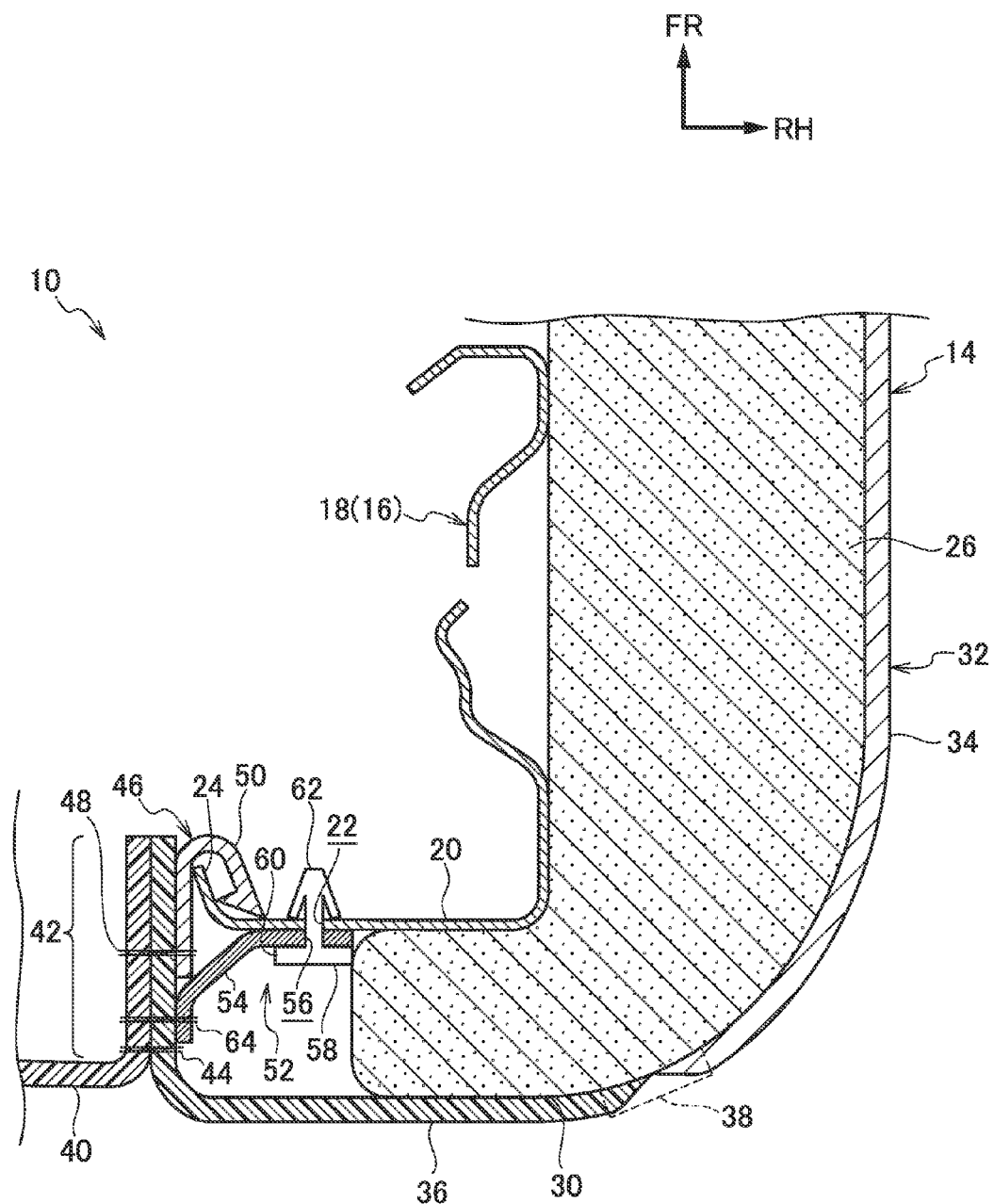
FIG. 4 is a magnified plan sectional diagram showing principal portions of a vehicle seat in accordance with a variant example of the exemplary embodiment of the present invention.

As illustrated in FIG. 4, a variant example of the vehicle seat 10 has substantially the same structure as the vehicle seat 10 according to the present exemplary embodiment but differs as follows. In the vehicle seat 10 of the variant example, the joining trim cover 54 is not sewn to the overlap portion 42 together with the J-hook 46 in the region of the second seam portion 48. The seat left side end portion of the joining trim cover 54 is inflected to the seat rear side and is sewn to the overlap portion 42 in the region of a third seam portion 64. In other words, the joining trim cover 54 and the J-hook 46 are sewn to the overlap portion 42 separately in the variant example. In this case too, movements of the overlap portion 42 to the seat left side may be restrained by the joining trim cover 54 and the clips 58. Therefore, movements of the J-hook 46 to the seat left side may be restrained. Accordingly, the variant example may provide the same operation and effects as the present exemplary embodiment.

In the present exemplary embodiment and the variant example, the joining trim cover 54 is formed of a cloth material, but the material of the joining trim cover 54 is not limited thus. For example, the joining trim cover 54 may be fabricated of resin and formed in a plate shape. In this case, the joining trim cover 54 and the clips 58 may be formed integrally, or the joining trim cover 54, the clips 58 and the J-hook 46 may be formed integrally.

In the present exemplary embodiment and the variant example, the flange portion 24 is disposed to be angled to the seat left side (the seat width direction inner side) toward the seat forward side in plan view. Instead, the flange portion 24 may be inflected to the seat forward side in plan view.

In the present exemplary embodiment and the variant example, the seat left side end portion of the joining trim cover 54 and the J-hook 46 are arranged in this order at the seat right side of the overlap portion 42, and these are sewn together. Instead, the J-hook 46 and the seat left side end portion of the joining trim cover 54 may be arranged in this order at the seat right side of the overlap portion 42 and sewn together.

In the present exemplary embodiment, the joining trim cover 54 is sewn to both the J-hook 46 and the overlap portion 42. Instead, the joining trim cover 54 may be sewn to the J-hook 46 and the joining trim cover 54 to which the J-hook 46 has been sewn may be sewn to the overlap portion 42.

In the present exemplary embodiment and the variant example, the joining trim cover 54 is fixed to the side frame 18 by the pair of clips 58, but the number of the clips 58 is not limited thus. For example, the joining trim cover 54 may be fixed to the side frame 18 by a single clip 58. In this case, the fixing hole 22 of the side frame 18 may be disposed at a position at a seat up-and-down direction middle portion of the rear end wall 20.

What is claimed is:

1. A vehicle seat comprising:
   a framework member that structures a framework of a seatback;
   a center rear face cover that structures a central portion of a rear face of the seatback;
   at each of two seat width direction side portions of the rear face of the seatback, a side rear face cover that adjoins the center rear face cover and structures the seat width direction side portion;
   an overlap portion at which an end portion of the center rear face cover and an end portion of the side rear face cover are sewn together in an overlapping state, the overlap portion extending to a seat forward side from the center rear face cover and the side rear face cover in plan view;
   an anchor member that is disposed at the overlap portion and that is anchored at the framework member and pulls the overlap portion in to the seat forward side; and
   a restraining portion that joins at least one of the overlap portion and the anchor member to the framework member, and restrains movement of the overlap portion.

2. The vehicle seat according to claim 1, wherein the restraining portion comprises:
   a joining member to which at least one of the overlap portion and the anchor member is sewn, the joining member being disposed along the framework member; and
   a fixing member that fixes the joining member to the framework member.

3. The vehicle seat according to claim 2, wherein the joining member is sewn to both the anchor member and the overlap portion.

4. The vehicle seat according to claim 1, wherein:
   the anchor member includes a hook portion that is open to the seat rear side in a state in which the anchor member is anchored at the framework member, and
   the framework member includes a flange portion at which the hook portion is anchored, the flange portion being angled in plan view to a seat width direction inner side toward the seat forward side.

5. The vehicle seat according to claim 1, further comprising, at each of two seat width direction side faces of the seatback, a fastener that detachably joins a side face cover structuring the seat width direction side face to the side rear face cover.

* * * * *